United States Patent [19]
Henry

[11] 3,905,236
[45] Sept. 16, 1975

[54] APPARATUS AND PROCESS FOR CONTINUOUSLY MONITORING THE DEPTH AND LOCATION OF STANDING WATER ON AIRCRAFT RUNWAYS AND THE LIKE

[76] Inventor: Richard Dale Henry, Hookstown Grade Rd, R.D. No. 1, Clinton, Pa. 15026

[22] Filed: May 7, 1973

[21] Appl. No.: 358,150

[52] U.S. Cl. ............... 73/304 R; 73/171; 340/213 R
[51] Int. Cl.² .................... G01F 23/00; G01F 23/20
[58] Field of Search .................. 73/304 R, 326, 171; 340/214, 213 R, 401, 188 R

[56] References Cited
UNITED STATES PATENTS

| | | | |
|---|---|---|---|
| 2,412,363 | 12/1946 | Silverman | 73/304 R X |
| 2,839,741 | 6/1958 | Kratville | 340/214 |
| 2,869,368 | 1/1959 | Brown | 73/304 R |
| 3,142,830 | 7/1964 | Patrick et al. | 73/304 R X |
| 3,186,224 | 6/1965 | Mair | 73/304 R |

*Primary Examiner*—Richard C. Queisser
*Assistant Examiner*—Daniel M. Yasich

[57] ABSTRACT

At the sides of the runway and between the sides of the runway where water can collect in standing pools, the occurrence and depth of such standing water is continuously monitored by means of electrodes which serve as switches closed by the coming into contact with water. Electrodes are spaced at calibrated levels so that they become closed by contact with the water when the water reaches a prescribed height. The water height is determined by closing of a "switch" consisting of electrode contact with water when it reaches a prescribed height. An associated remotely disposed indicator is energized to signal the occurrence of water at the so-indicated height. The indicators consist of a number of lamps such as light emitting diodes and the like, and each lamp is independently energized by a direct current voltage derived from an alternating current source acting through a transformer diode bridge and choke. Each lamp has an associated switch which can turn the lamp "on" and "off" independently of the indicator electrode to verify working ability of the lamp.

2 Claims, 5 Drawing Figures

APPARATUS AND PROCESS FOR CONTINUOUSLY MONITORING THE DEPTH AND LOCATION OF STANDING WATER ON AIRCRAFT RUNWAYS AND THE LIKE

BACKGROUND OF THE INVENTION

In my copending application, Ser. No. 261,198, filed June 9, 1972, now U.S. Pat. Ser. No. 3,861,212 and entitled "APPARATUS AND PROCESS FOR CONTINUOUSLY MONITORING THE DEPTH AND LOCATION OF STANDING WATER ON AIRCRAFT RUNWAYS AND THE LIKE" I disclose the concept of usage of a number of electrodes which are spaced apart by calibrated amounts to indicate the depth of standing water at a given location on a runway or the like.

Each electrode acts as a switch which is closed when the water reaches a prescribed height.

What is intended in the present invention is an improvement in the indicator means for determining the height of water at the remote location. In the present invention, it is intended to provide a means which determines whether the indicator means is in proper operating condition to enable it at all times to determine the height of the water on the runway.

OBJECTS OF THE INVENTION

The principal object of the present invention is the provision of an improved method and apparatus for continuously monitoring the depth and location of standing water on aircraft runways and the like.

A further object of the present invention is to provide an improved sensing means for directly informing the occurrence and depth of water at remote locations on aircraft runways and to accomplish such with ultrasensitive indicators which are protected against burnout because of voltage surges.

A still further object of the present invention is to provide an improved process and apparatus for indicators which will make it readily possible to test any single indicator, whenever desired, to determine whether the device is properly working and that each indicator is working with the same intensity of readout, while itself being adequately protected against burnout or damage.

Other objects and features of the present invention will become apparent from a consideration of the following description which proceeds with reference to the accompanying drawings, wherein a plurality of embodiments of the invention are selected by way of example.

DRAWINGS

SPECIFIC WORKING EMBODIMENT OF THE INVENTION

Figure 1:
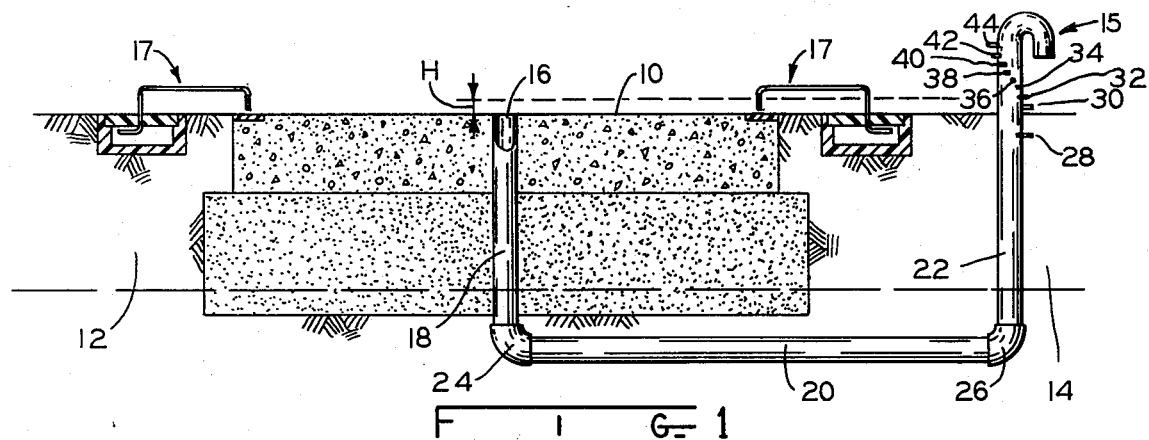
FIG. 1 is a sectional view showing schematically the location of the indicator means in the sides and center of the runway respectively.

Referring now to the drawings, a paved runway 10 has, between its sides 12 and 14, an opening 16 in a vertical conduit 18 connected with a lateral conduit 20 and a vertical conduit section 22 at the side 14 of the runway 10. Conduit sections 18 and 22 are connected with lateral conduit 20 by elbows 24 and 26. Within conduit section 22 are a plurality of electrical sensing elements or electrodes 28, 30, 32, 34, 36, 38, 40, 42 and 44 so that as water in conduit 22 attains the same level as the level of standing water on the runway, the electrodes 28-44 indicate the depth of standing water overlying opening 16 on the runway. The depth of water overlying opening 16 is matched by the corresponding water height above ground level within conduit 22, and depending upon water height in conduit 22, one or the other of the calibrated electrodes 28-44 will be contacted by the water to make an electrical circuit.

The electrodes 28-44 are spaced in conduit 22 in a helical pattern and the relative spacing of the electrodes in conduit 22 is calibrated so that depending upon the water level, the particular electrodes which are immersed and hence activated by the water, will provide a direct indication of water level. For example, referring to FIG. 1, a water level on the runway of a height "H" will immerse electrodes 28, 30 and 32 and since the electrodes are spaced one-eighth of an inch apart, this indicates that there is two-eighths of an inch of standing water above the runway 10.

Each electrode is electrically connected by conductors 46, 48, 50, 52, 54, 56, 58, and 60 (FIG. 3) and each conductor has a respective light 82, 84, 86, 88, 90, 92, 94 and 96. The first light 82, is a calibration light which is responsive to electrodes 28 and 30 indicating that there is sufficient water in conduits 18 and 22 to provide an accurate readout and with a height of water "H" corresponding to two-eighths of an inch, lights 82, 84, will be lit each light in succession representing one-eighth inch standing water on the runway 10.

There can be a number of sampling points on the runway 10 each having an opening 16 (FIG. 1) and a sensing device, at selected locations on the runway 10, preferably along those low spots which are prone to collect water to a greater extent than other portions of the runway. However, the invention also contemplates a grid sampling of the entire runway 10 as well as selective testing at only those portions of the runway which are most prone to receive and retain surface water.

The same control or display is adapted for providing information of standing water for any one of various sensing devices by means of selector switch which can be switched to different positions indicating different locations on the runway and, depending upon the light display, information can be obtained as to standing water at any one of the locations by simply operating such switch.

Figure 2:
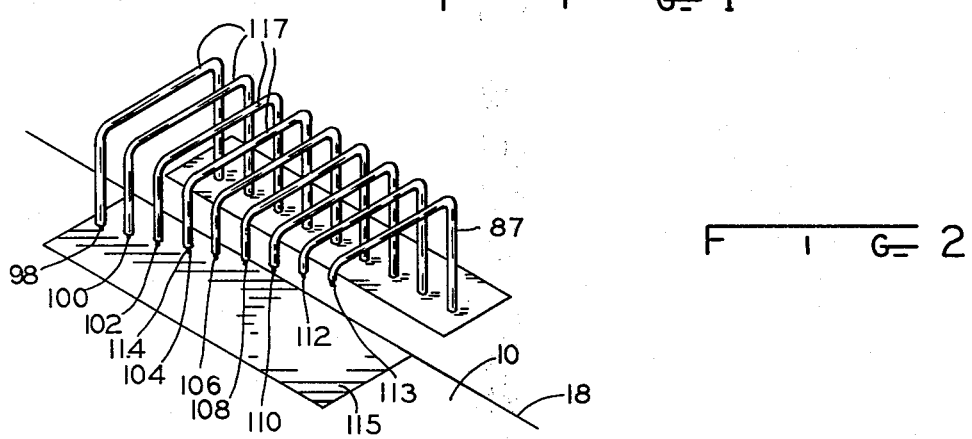
FIG. 2 is an isometric view illustrating in greater detail the sensing means which are located at the side of the runway.

At the sides of the runway 12 and 14 are a second set of sensors designated generally by reference numeral 87 (FIG. 2). The sensor elements at the sides 12, 14 of the runways are identical and only one set of these sensor elements will be described in relation to FIGS. 2 and 3. As indicated in FIG. 2, at the side 12 of runway 10 are a plurality of electrode sensing elements 98-113 which consist of electrical conductors 114 having insulation coating 117 which provides only for exposure of the ends of the conductors spaced at calibrated amounts above the level of runway 10 having a low dielectric plate 115 embedded on the runway 10, such spacing being at one-eighth inch vertical increments above the level of the runway commencing with electrical sensor 98. Therefore, standing water on the runway at the side 12 of the runway 10 (FIG. 2) in the amount of one-eighth of an inch will energize electrode sensor 100, two-eighths inches will activate sensor 102 and so forth. Depending upon the polarity of the probes, circuits are established which complete circuits between the probes or with other portions of the circuit.

Figure 3:
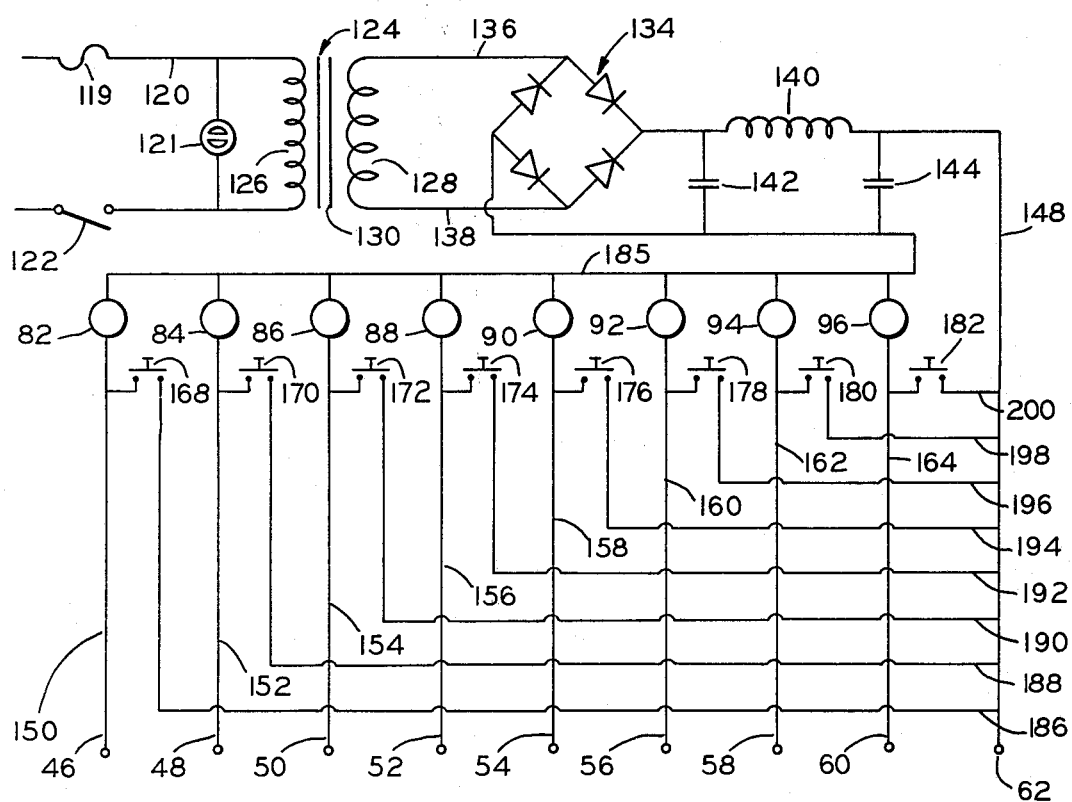
FIGS. 3, 4 and 5 are schematic views of the circuit diagrams in different embodiments illustrating how the indicator means are actuated in response to various depths of water at the runway sections monitored by the means shown in FIGS. 1 and 2.

Each electrode is operatively connected to a respective light 82–96 in the manner indicated in FIG. 3 and each light is energized from an A.C. source 119 in a power line 120 having a neon light 121, a switch 122 and a transformer 124, the A.C. current being applied to the primary coils 126 which are coupled to secondary coils 128 through a core 130. The secondary winding 128 is connected to a rectifier bridge 134 through conductors 136 and 138. From the rectifier bridge 134 a pulsating D.C. current is applied through a choke 140 and condensers 142 and 144 connected in parallel with the choke 140. The transformer then supplies a smooth D.C. voltage through line 148 to each of the indicators or display lights 82–96. As shown in FIG. 3 each display light has a conductor 150–164 connecting it to one of the other electrodes 100–113 so that as the exposed tip 114 is immersed in water, it will cause the appropriate indicator light 82–96 to become illuminated.

As shown in FIG. 3, each of the indicator lights 82–96 is also subject to illumination by closing an associated switch 168–182 which closes the circuit from conductor 148 through one of the conductors 186–200 through the closed switch and the indicator light back to conductor 185 which is routed via the rectifier bridge 134.

Figure 4:
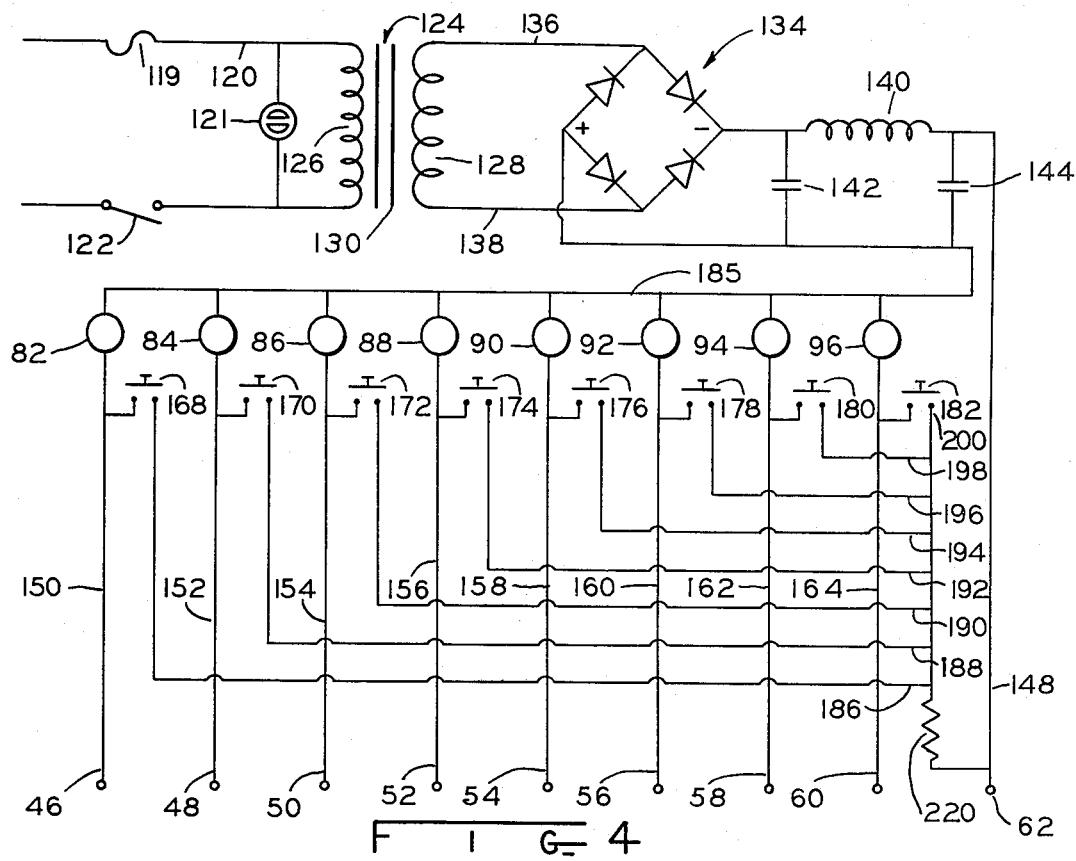

As shown in FIG. 4 the conductor 148 may include a resistor 220 to provide a protective resistance for each of the indicator lamps 82–96 and in this way during the test by test switch operation effected by closing the respective switches there is provided in effect a common dropping resistor to prevent burnout of the associated lamps 82–96 from too high a current flow during test.

Figure 5:
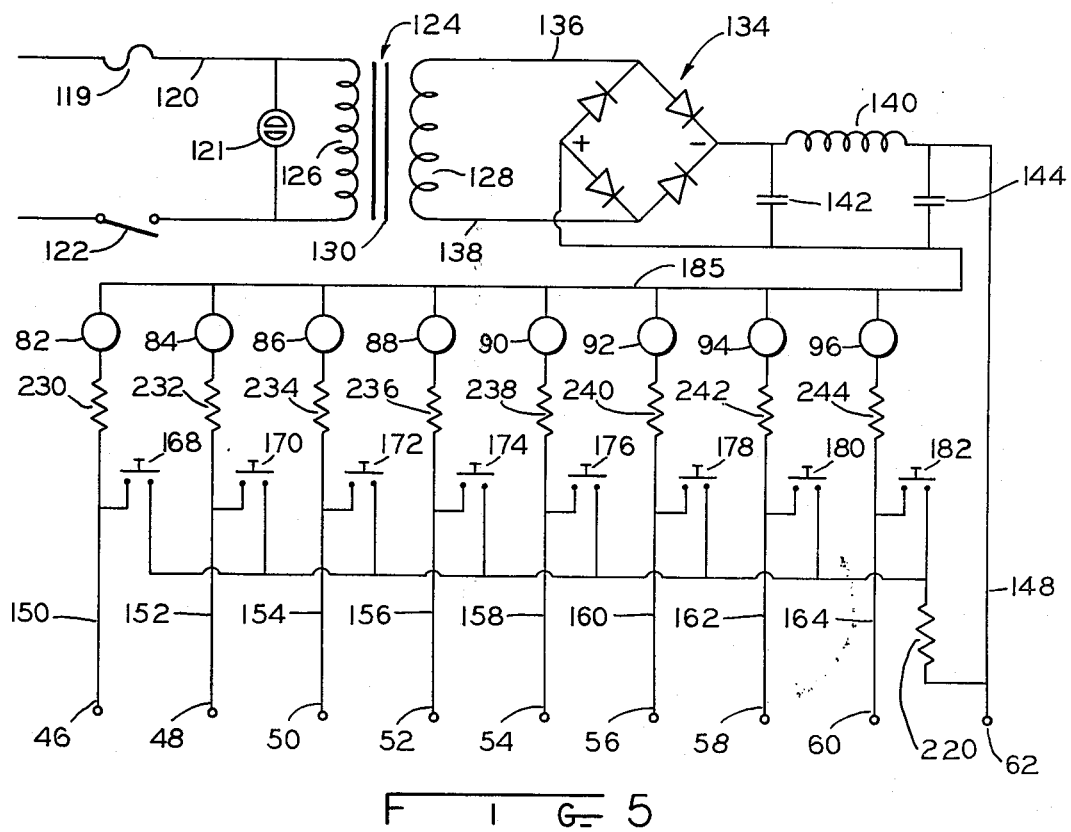

In a still further embodiment shown in FIG. 5, each of the conductors 150–164 may include a resistor 230–244 which act as dropping resistors enabling the use of ultrasensitive indicators 82–96 and preventing their burnout in the event of excess current flow.

OPERATION

In operation, as standing water collects on the runway it is measured at or between the sides of the runway by one of the devices 15, 17. Water enters opening 16 and the extent of standing water above the level of the runway 10 in the vicinity of opening 16 is matched by the same level of water in conduit 22.

It should be noted that the conduits 18, 20, 22 are plastic material having a high dielectric constant property. Depending on the level of water in conduit 22 one or more of the electrodes 28–44 will be immersed in water and when the electrode is immersed it will create an electrical contact which is transmitted as a closed circuit through conductors 46–60 (FIG. 3), causing one or more of the lights 82–96 to become illuminated and indicating in a direct readout, the level of water at the location sampled.

The spacing of the electrodes 28–44 is in calibrated ⅛ inch increments hence the standing water is read directly as one of the lamps 82–96 of the display.

A switch (not shown) is used to connect the readout panel with any one of a number of sensing devices, so that depending upon the selection of such switch, information is given concerning water depth at the particular locations determined by the selector switch.

At the sides of the runway electrode sensors 98–113 are operative and the height of water above the runway determines which of the electrodes is immersed in water above the high dielectric plate 115 which is embedded in the surface of the runway at side 14. Thus, information concerning water depth is obtainable not only between the sides of the runway but at the runway sides as well.

The sampling devices are locatable either at selected locations between the sides of the runway which are predetermined to be "problem" areas of a runway or the entirety of the runway can be located with sensors depending upon the particular design required.

During operation, should it be desired to test whether or not the indicator lamps 82–96 are operating satisfactorily, all that is required is to close the associated switch 168–182 for one or the other of the indicators 82–96 by selectively closing any one or a combination of switches 168–182 and this will produce a circuit through conductor 148 through one of the associated conductors 186–200 to determine whether the associated indicator means is functioning properly.

The indicator means can be protected with an in-series resistor 220 (FIG. 4) or a combination of resistor 220 and an additional resistor 230–244 to preclude surging of current through the indicator means. The indicator means is of course further protected by the additional resistance 230–244, these resistances being individually associated with a respective indicator 82–96.

By providing a display as described there is available to the ground controller, accurate and continuous information concerning the location and depth of standing water on runways and such information can be readily communicated to assist in a selection of runway or portions of a runway and thereby contribute to the safety of landing and take off operations.

In shunt across the primary of the transformer is a neon bulb indicating device 121 which is a source of power indicator which will indicate power on if lit or power loss if not lit.

It will be understood that indicators 82 through 96 may also include the use of the following types of indicators: VOLTMETERS, MILLIVOLTMETERS AND MICROVOLTMETERS, AMMETERS, MILLIAMMETERS AND MICROAMMETERS (SHUNT OR SHUNTLESS). This listing is in addition to previous listing in copending application Ser. No. 261,198.

Although the present invention has been illustrated and described in connection with a few selected example embodiments it will be understood that these are illustrative of the invention and are by no means restrictive thereof. It is reasonably to be expected that those skilled in this art can make numerous revisions and adaptations and it is intended that such revisions and adaptations will be included within the scope of the following claims as equivalents of the invention.

What I claim is:

1. In a process for continuously monitoring the depth and location of standing water on aircraft runways and the like, the improvement comprising the steps of sensing the depth of water through a series of probes each having at least one exposed conductor portion at spaced increments from the surface of the runway and each independently and electrically operatively connected to a remotely disposed readout device having a series of indicator means, supplying a rectified direct current energy source to each of said read out devices which are connected in parallel, connecting each of said readout devices to said rectified direct current supply voltage through separate and independently operatable switching means to determine the workability of each such indicator means and separately and independently communicating an alternating current source through a transformer means and diode bridge to provide a DC voltage communicable to each such indicator means through said respective exposed conductor portions which act as sensing switches and wherein each indicator means includes a resistance to protect each such indicator means.

2. The process in accordance with claim 1 including the step of seaprately and independently communicating an alternating current source through a transformer means and diode bridge to provide a DC voltage source.

* * * * *